Aug. 9, 1960     L. C. RUBENS ET AL     2,948,665
PROCESS FOR MAKING CELLULAR POLYETHYLENE ARTICLES
Filed Oct. 18, 1956
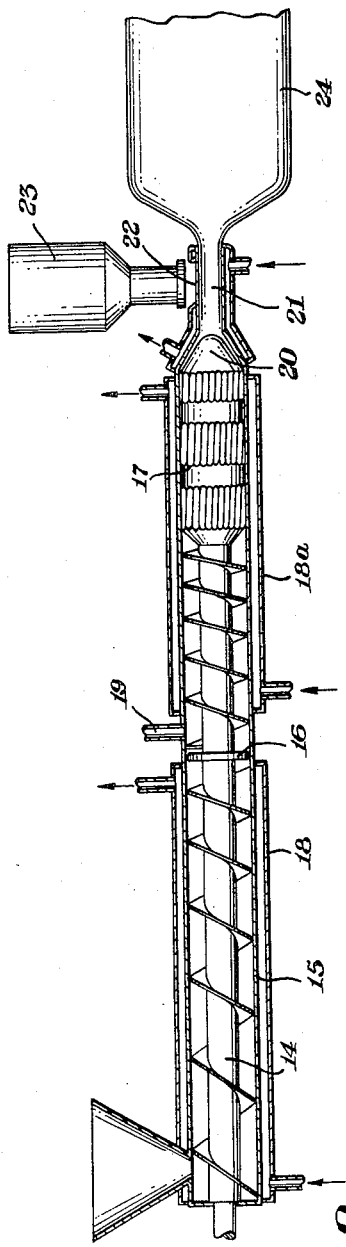
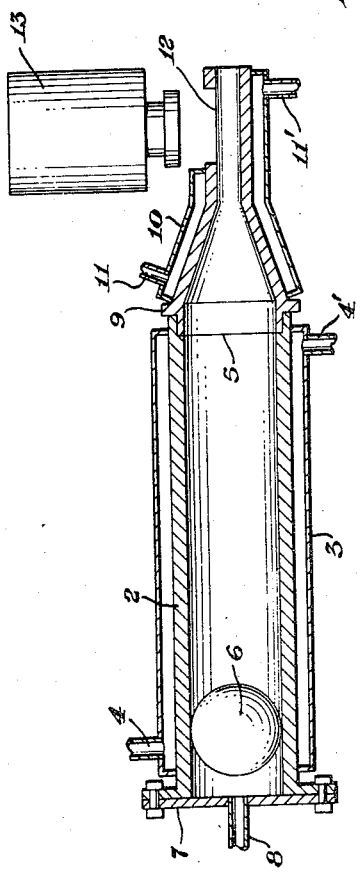
INVENTORS.
Louis C. Rubens
John Dennis Griffin
Demetrius Urchick
BY Griswold & Burdick
ATTORNEYS

2,948,665
PROCESS FOR MAKING CELLULAR POLY-ETHYLENE ARTICLES

Louis C. Rubens, John D. Griffin, and Demetrius Urchick, Midland, Mich., assignors to The Dow Chemical Company, Midland, Mich., a corporation of Delaware Filed Oct. 18, 1956, Ser. No. 616,662

5 Claims. (Cl. 204—154)

This invention concerns a process for making cellular polyethylene articles. It relates more particularly to a method of treating ethylene polymer having a foaming agent dispersed throughout and of expanding the same to form a cellular product composed for the most part of individually-closed thin-walled cells.

In the preparation of cellular products from thermoplastic resins it is common practice to incorporate in the material to be "foamed" a solid blowing agent which, under the influence of heat, evolves gas thus causing the formation of numerous cells which impart low density to the finished product. It is known to incorporate a gas or a normally gaseous agent with a thermoplastic resin and heat the latter under pressure to a temperature at which it becomes plastic and suddenly release the pressure to obtain cellular articles of low density. U.S. Patent No. 2,387,730 makes cellular polyethylene by a procedure which involves impregnating molten polyethylene with a gas that is soluble in the molten polymer under pressure, partially releasing the pressure while maintaining the temperature to expand the polymer and cooling the expanded polymer. The methods heretofore proposed for making cellular polyethylene have the disadvantage that the expanded polymer has a tendency to shrink or collapse upon sudden release of the pressure unless rapid and efficient cooling is effected to solidify the foam. This frequently results in a product composed of non-uniform and irregular cells.

It is an object of the invention to provide a process for making foamed articles from ethylene polymers, which articles are composed for the most part of individually-closed thin-walled cells of uniform or substantially uniform size. Another object is to provide a new and improved method of preparing cellular polyethylene having low density, very small uniform cells and good resiliency and stability. A further object is to provide improvements in a process for making cellular polyethylene which improvements inhibit or substantially inhibit the tendency of the hot foamed polyethylene to shrink or collapse prior to cooling of the same. Other and related objects may appear from the following description of the invention.

According to the invention, the foregoing and related objects are obtained by a procedure which involves forming under pressure a flowable melt or mobile gel comprising essentially molten ethylene polymer having a foaming agent uniformly dispersed throughout, feeding the gel into a zone where the gel is subjected to ionizing radiations under pressure and thereafter extruding the gel into a zone of sufficiently lower pressure to cause expansion of the polymer with resultant formation of a foam.

It has been found that subjecting the gel to ionizing radiations in amount sufficient to bring about an increase in resistance to flow of the polymer at a temperature of 100° C. and insufficient to prevent appreciable flow of the polymer at said temperature, prior to releasing the pressure results in entirely preventing or substantially inhibiting the tendency of the foamed material to shrink or collapse, and yields cellular articles composed for the most part of uniform small cells, which cellular articles have good stability and resiliency.

Ionizing radiation, as the term is well understood in the art, concerns the exposure of a material such as high polymers and especially ethylene polymers to beta rays, gamma rays, X-rays, neutrons, accelerated electrons, etc. Convenient sources for such radiations may be furnished by atomic piles, electron or particle accelerators, radioactive isotopes, e.g. cobalt 60, and X-ray equipment.

In general, an amount of ionizing radiation corresponding to a dose of from 1 to 20 mega-R.E.P.'s for the polyethylene is satisfactory, depending in part upon the molecular weight of the polyethylene initially used.

The invention is described more particularly with reference to the accompanying drawing, wherein:

Fig. 1 is a diagrammatic drawing partly in section, illustrating an arrangement of the essential components of an apparatus suitable for practice of the invention.

Fig. 2 is a diagrammtic drawing of the essential components of an arrangement of apparatus for practice of the invention in continuous manner.

In Fig. 1 of the drawing the numeral 2 indicates a pressure-resistant metal tube or cylinder surrounded by a jacket 3 having suitable inlets or outlets 4 and 4' for passage of a heat transfer medium therethrough. The cylinder 2 is equipped with a frangible disc 5 and a plunger or piston 6, suitably a metal ball, which is movable in said cylinder. The cylinder is closed on one end by a cover plate 7 having a valved inlet 8 and is connected at the other end to extrusion head 9. Head 9 is surrounded by jacket 10 having suitable inlets or outlets 11 and 11' for passage of a heat transfer medium therethrough. Extrusion head 9 comprises a continuation of cylinder 2 and tapers to a constricted passageway or orifice at its discharge end. Head 9 is fitted with a thin metal window 12, suitably a plate of brass or stainless steel of from 5 to 10 mils thick, adjacent to the constricted passage or discharge orifice, which permits ionizing radiations, e.g. accelerated electrons, gamma rays, etc., to pass through it and affect the polymer. The ionizing radiation may be furnished by a Van de Graaff electron accelerator, cobalt 60 or other suitable equipment 13.

Fig. 2 of the drawing illustrates a horizontal plastics extruder having a feed screw 14 of the compression type in cylindrical barrel 15. The feed screw 14 has a perforated sealing plate or disc 16 on a midsection thereof, suitably from one-half to three-quarters of the distance between the feed hopper and the discharge end of the screw. The sealing plate 16 is suitably an annular enlargement of the body of the screw 14, of a diameter enough smaller than the bore of the barrel 15 to leave a clearance of from 0.125 to 0.25 inch between the two members, or it may consist of a perforated plate secured to the screw 14 and containing a number of drill holes of from 0.125 to 0.375 inch diameter, in which case running clearance between the rim of the plate and the bore of the barrel is satisfactory. The screw 14 is fitted with a mixing head or torpedo 17 which may be similar to that described in U.S. Patent No. 2,453,088. The barrel 15 is surrounded by jackets 18 and 18a having suitable inlets or outlets for passing a liquid heat transfer medium, e.g. air, steam, water, oil, etc., therethrough. Beyond sealing plate 16 on the screw 14 is an inlet 19 into the barrel 15 of the extruder. The barrel 15 is fitted with a jacketed head 20 having suitable inlets or outlets for passing a liquid heat transfer medium through the jacket. Head 20 comprises a continuation of the passageway from barrel 15 and tapers to a constricted passageway or orifice 21 at its discharge end. Head 20 is fitted with a thin metal window 22, suitably a plate of brass or stainless steel of from 5 to 10 mils thick adjacent to the constricted passageway which permits the ionizing radiations, e.g. accelerated electrons or gamma rays, to pass through it and affect the polymer as it passes through the constricted passageway 21 below the window 22. The ionizing radiations may be furnished by a Van de Graaff electron accelerator or cobalt 60 from a source 23 and positioned adjacent to the window 22. The numeral 24 indicates the expanding polymer emerging from the extruder into the atmosphere.

Polyethylene to be employed in the process can be any of the normally solid ethylene polymers having a melt index between about 0.1 and 20 and melting between about 100° and 200° C., depending upon their molecular weight, which is preferably 4000 or greater. They correspond in composition substantially to $(CH_2)_x$ and show a crystalline structure when subjected to X-ray diffraction analysis.

The foaming agents to be employed in the process are gases at ordinary temperatures and pressures and can be tetramethylmethane, monochlorodifluoromethane, monochlorotrifluoromethane, dichlorodifluoromethane or dichlorotetrafluoroethane, or mixtures of any two or more of such normally gaseous compounds.

The foaming agent can be incorporated with the ethylene polymer in usual ways, e.g. by heating the polyethylene to its melting temperature or above in contact with the normally gaseous compound under pressure or by agitating or compounding the ingredients in admixture with one another under pressure in a plastics extruder, a Banbury mixer or other suitable pressure-resistant and gas tight vessel. It is important that the polyethylene and the foaming agent be intimately incorporated with one another to form a homogeneous or substantially uniform melt or gel prior to subjecting the same to ionizing radiations and extrusion into a zone of lower pressure where it expands to yield a cellular product in order to obtain the beneficial results of the invention. The foaming agent can be used in amount corresponding to from 2 to 15 grams per 100 grams of the polyethylene initially used. Finely divided inert materials such as calcium silicate, barium sulfate or silica are advantageously incorporated with the polyethylene or gel to serve as sites for initiating the formation of cells in the foamed product, but the use of such inert materials is not required.

The melt or gel can be extruded at temperatures of from 90° to 220° C., preferably from 95° to 160° C.

In practice of the invention employing an arrangement of apparatus similar to that shown in Fig. 1 of the drawing, polyethylene, suitably solid polyethylene having a melt index of at least 2 corresponding to a number average molecular weight of about 30,000 or greater, is placed in the metal cylinder 2 with the frangible disc 5, e.g. a metal disc having a bursting strength of from 500 to 600 pounds per square inch, intact. A normally gaseous foaming agent, e.g. dichlorotetrafluoroethane, is added in the desired amount. The piston or plunger 6 is inserted, followed by a plastic sealant, suitably a portion of the polyethylene, and the cover plate 7 is attached, thereby sealing the unit. A liquid heat transfer medium is passed through the jackets 3 and 10 to bring the unit and materials to a desired temperature under pressure and form a mobile gel of the polyethylene and the foaming agent. Thereafter, a liquid such as ethylene glycol or glycerine, or a gas, e.g. nitrogen, in which the plastic sealant is insoluble, is pumped into the vessel 2 via inlet 8 under pressure sufficient to rupture the frangible disc 5 and move the plunger 6 through the cylinder thus extruding the gel through the constricted passageway of head 9 past the window 12 and into the atmosphere wherein it expands to form a cellular product upon the sudden release of the pressure. During passage of the gel under pressure in front of the window 12 it is subjected to ionizing radiations in amount sufficient to cause an increase in resistance to flow of the polyethylene at a temperature of 100° C. and insufficient to prevent appreciable flow of the polymer at said temperature, e.g. ionizing radiations in amount corresponding to a total dosage for the polyethylene of from 1 to 20 mega-R.E.P.'s.

In practice of the invention in continuous manner employing an arrangement of apparatus the essential components of which are shown in Fig. 2 of the drawing, solid granular polyethylene is fed to the plastics extruder via the hopper and onto the feed screw 14 in the first section of the extruder, wherein the polyethylene is pressed, melted and the molten polymer forwarded through or around the sealing plate 16. Flow of the molten polymer through or around sealing plate 16 forms an effective seal against counter-current leakage of gas or foaming agent. A normally gaseous compound such as dichlorodifluoromethane, monochlorodifluoromethane, neopentane or dichlorotetrafluoroethane, is fed under pressure into the barrel 15 of the extruder via inlet 19 and into admixture with the molten polyethylene in the second or mixing section of the extruder. The feed screw 14 consists of a first feed or forwarding section, a sealing plate 16 at its midsection and a mixing section beyond the sealing plate which may consist of flights of lesser forwarding action than the flights of the feed section and a mixing torpedo 17 as shown or lugs or spurs adapted to scrape the bore of the barrel at each of a plurality of closely spaced regions throughout a major portion of the length of the mixing zone in a manner preventing appreciable accumulation of the mixture as a static layer on stationary walls defining said zone and provide agitation of the material transverse to the flow. The agitation is sufficient to prevent channeling and to blend the mixture of the polyethylene and the normally gaseous foaming agent into a substantially uniform composition at a temperature at which it remains flowable under the conditions employed. The flights, lugs or other means such as a mixing head of type described in U.S. Patent No. 2,453,088, employed to blend the mixture of the foaming agent and the polyethylene into a uniform composition can be adapted to move the material forward and backward in said mixing zone, i.e. work or knead the material, agitate the material with little or no forwarding action or rapidly forward the material away from the inlet 19 so as to reduce the tendency toward plugging of said inlet with molten polymer, followed by a lesser forwarding action or even a reverse movement on the material which intimately blends the materials into a uniform composition which is forwarded into head 20, through constricted passageway 21, is exposed to ionizing radiations via window 22 and is extruded into a zone of sufficiently lower pressure, e.g. the atmosphere, to cause expansion of the extruded material with formation of a cellular polyethylene foam. The temperature of the material is controlled as desired by passing a liquid heat transfer medium through the jackets of head 20 and the mixing section of the extruder.

The following examples illustrate ways in which the principle of the invention has been applied but are not to be construed as limiting its scope.

*Example 1*

A charge of 70 grams of ethylene polymer having a melt index of 2, which polymer was prepared by polymerizing ethylene under high pressure, together with 10.5 grams of dichlorotetrafluoroethane was placed in the barrel of a pressure resistant metal tube between a movable piston and a valved ⅛ x ½ inch rectangular outlet. The tube and its contents were heated at a temperature of 150° C. for a period of 3 hours. Thereafter, the outlet valve was opened. The polyethylene containing the dichlorotetrafluoroethane blowing agent under pressure was pressed at a temperature of about 150° C. into the constricted passageway and was subjected to ionizing radiation of electrons from a Van de Graaff accelerator for a dosage corresponding to $4 \times 10^6$ R.E.P. just prior to extruding the material into the atmosphere. The polyethylene was extruded at a rate of about 140 grams per minute. The extruded material foamed to yield a cellular strip composed for the most part of individually-closed thin-walled cells of approximately 1/32 inch diameter. The product had a density corresponding to 2.6 pounds per cubic foot, a smooth surface and good resiliency and stability.

In contrast, polyethylene foamed under similar conditions, but without exposure to ionizing radiation, expanded and partially collapsed to give a cellular product having cells of sizes ranging up to 1/4 inch diameter. This product had a density corresponding to .9 pounds per cubic foot, non-uniform cells and poor resiliency and stability.

*Example 2*

A charge of 70 grams of ethylene polymer having a melt index of 2, and 14 grams of dichlorotetrafluoroethane was heated at a temperature of 125° C. for period of 4 hours in the barrel of a pressure-resistant metal tube. The material was then extruded at a temperature of about 125° C. through an orifice and at a rate of 140 grams per minute into the atmosphere, while subjecting the materials to ionizing radiations from a Van de Graaff accelerator at a dose of $4 \times 10^6$ R.E.P. just prior to extruding the material into the atmosphere and release of the pressure, employing procedure similar to that employed in Example 1. The product had a density corresponding to 2.8 pounds per cubic foot and was composed of uniform cells about 1/32 inch in diameter. It had good resiliency and stability.

*Example 3*

A charge of 60 grams of ethylene polymer having a melt index of 2 and containing one percent by weight of finely divided calcium silicate uniformly dispersed therein, and 12 grams of dichlorotetrafluoroethane was heated under pressure at a temperature of 125° C. for a period of 3 hours. It was then extruded at a temperature of about 125° C. through an orifice while being exposed to ionizing radiations from a Van de Graaff accelerator at a dose of $4 \times 10^6$ R.E.P., employing procedure similar to that employed in Example 1. The product had a density corresponding to 3.1 pounds per cubic foot. It was composed of uniform cells of approximately 1/64 inch diameter and had good resiliency, stability and a smooth surface.

*Example 4*

A charge of 70 grams of ethylene polymer having a melt index of 6.6 and 12.2 grams of dichlorotetrafluoroethane was heated under pressure at a temperature of 150° C. for a period of 3 hours. It was extruded at a temperature of about 150° C. through an orifice and at a rate of 55 grams per minute into the atmosphere while subjecting the materials just prior to extruding the same into the atmosphere to ionizing radiations from a Van de Graaff accelerator at a dose of $10 \times 10^6$ R.E.P., employing procedure similar to that employed in Example 1. The cellular product had a density corresponding to 3.4 pounds per cubic foot. It was composed of uniform cells of about 1/16 inch diameter and had good resiliency.

*Example 5*

A charge of 70 grams of polyethylene having a melt index of 2 was heated with 16 grams of dichlorotetrafluoroethane under pressure of the ingredients at a temperature of 150° C. for a period of 1.6 hours. It was then extruded at a temperature of about 150° C. through an orifice at a rate of 35 grams per minute into the atmosphere while subjecting the material to ionizing radiations from a Van de Graaff electron accelerator at a dose of $15 \times 10^6$ R.E.P., employing procedure similar to that employed in Example 1. The cellular product had a density corresponding to 3.2 pounds per cubic foot and was composed of uniform cells of about 1/32 inch diameter. Similar results are obtained when monochlorodifluoromethane, dichlorodifluoromethane or monochlorotrifluoromethane are employed in place of the dichlorotetrafluoroethane used in the example.

*Example 6*

Polyethylene having a melt index of 2 was fed in the form of solid granules into a plastics extruder at a rate corresponding to 60 pounds of the mixture per hour. The plastics extruder employed in the experiment comprised a four foot long barrel having a 2½-inch diameter screw equipped with a mixing head similar to that described in U.S. Patent No. 2,453,088 and had a sealing plate positioned midway of the screw and an inlet to the barrel adjacent to the inlet plate for feed of a normally gaseous agent into the extruder. The plastics extruder comprised an arrangement of apparatus similar to that shown in Fig. 2 of the drawing. The polyethylene was heated to a temperature of 150° C. in a first section of the extruder. The molten polymer was forwarded under pressure of the screw around the sealing plate and into a second section of the barrel where it was mixed with dichlorotetrafluoroethane fed thereto under pressure at a rate of 8.175 pounds per hour. The resulting mixture was blended under pressure to a uniform gel and cooled to a temperature of 102° C., then forced through a terminal section of the plastics extruder comprising a constricted passageway having the cross sectional dimensions of 1/8-inch thick by 2 inches wide and extruded (through a discharge orifice 1/8-inch thick by 2 inches wide) into the atmosphere and allowed to expand. The constricted passageway was fitted with a 10 mil thick stainless steel window 3/8 inch wide by 2 inches long positioned a distance of 3/8 inch from the discharge orifice. A Van de Graaff electron accelerator was positioned so that the window for emerging electrons was 1½ inches from the window in the constricted passageway of the plastics extruder. After establishing equilibrium or controlled conditions of feed of the polyethylene at a rate of 60 pounds per hour, feed of the dichlorotetrafluoroethane of 8.715 pounds per hour, heating of the polyethylene to a temperature of 150° C. in a first section of the plastics extruder and blending, cooling and extruding of the gel at a temperature of 102° C. into the atmosphere and allowing it to expand, the extruded material foamed and rapidly collapsed to a dense cellular polyethylene which was a hard stiff product having a cross section of about 5/8 x 2½ inches and a very rough surface and was composed of coarse irregular cells of sizes varying from 1/4 inch to 1/4 by 3/4 inch. This product had a density of 21.4 pounds per cubic foot. Thereafter, the Van de Graaff accelerator was turned on at 250 microamperes and 2 m.e.v. and the stream of gel subjected to the resulting beam of electrons as it passed under the 10 mil thick stainless steel window previously mentioned, just prior to the gel being extruded into the atmosphere. The foamed polyethylene obtained by expanding the irradiated gel was a soft, flexible resilient sheet having a cross section of about 5/8 x 6 inches, a uniform surface and was composed of small cells of sizes between 2 and 4 millimeters. The product had a density of 3.9 pounds per cubic foot of the foam. The foamed polyethylene prepared from the irradiated gel showed no tendency to shrink or collapse when it was allowed to expand in the atmosphere and cool to room temperature.

We claim:

1. In a process for making polyethylene foam wherein a flowable gel comprising essentially polyethylene having a normally gaseous agent selected from the group consisting of tetramethylmethane, monochlorodifluoromethane, monochlorotrifluoromethane, dichlorodifluoromethane and dichlorotetrafluoroethane, intimately incorporated therewith under pressure is expanded by suddenly releasing the pressure by extruding the gel into a zone of lower pressure sufficient to cause expansion of the extruded material with resultant formation of a foam, the step which consists in subjecting the gel under pressure to ionizing radiations in amount corresponding to a total dose of from 1 to 20 mega-R.E.P.'s in a field having an intensity of at least 3 mega-R.E.P.'s per second and sufficient to bring about an increase in resistance to flow of the polyethylene at a temperature of 100° C. and insufficient to prevent appreciable flow of the polyethylene at said temperature, at a point just prior to extruding the material into the zone of lower pressure.

2. A process for making polyethylene foam which comprises forming under pressure a flowable gel comprising essentially molten polyethylene having a foaming agent selected from the group consisting of tetramethylmethane, monochlorodifluoromethane, monochlorotrifluoromethane, dichlorodifluoromethane and dichlorotetrafluoroethane uniformly dispersed throughout, feeding the gel into a treating zone and subjecting said gel under pressure to ionizing radiations in amount corresponding to a total dose of from 1 to 20 mega-R.E.P.'s in a field having an intensity of at least 3 mega-R.E.P.'s per second and sufficient to bring about an increase in resistance in flow of the polyethylene at a temperature of 100° C. and insufficient to prevent appreciable flow of the polyethylene at said temperature and thereafter extruding the gel into a zone of lower pressure sufficient to cause expansion of the extruded material with resultant formation of a cellular body.

3. A process as claimed in claim 2, wherein the process is carried out in continuous manner.

4. A process as claimed in claim 2, wherein the foaming agent is sym-dichlorotetrafluoroethane.

5. A process as claimed in claim 2, wherein the ionizing radiation is furnished by accelerated electrons.

References Cited in the file of this patent
UNITED STATES PATENTS

| | | |
|---|---|---|
| 2,256,483 | Johnston | Sept. 23, 1941 |
| 2,387,730 | Alderson | Oct. 30, 1945 |
| 2,409,910 | Stober | Oct. 22, 1946 |
| 2,450,436 | McIntire | Oct. 5, 1948 |
| 2,576,911 | Amos | Dec. 4, 1951 |
| 2,576,977 | Stober | Dec. 4, 1951 |
| 2,774,991 | McCurdy et al. | Dec. 25, 1956 |

FOREIGN PATENTS

| | | |
|---|---|---|
| 730,476 | Great Britain | May 25, 1955 |
| 64,192 | France | May 18, 1955 |
| | (2d addition to No. 1,079,401) | |

OTHER REFERENCES

"I. and E. Chem.," vol. 45, September 1953, pp. 13A, 15A.

Charlesby: "Nucleonics," vol. 12, No. 6 pp. 18–25, June, 1954.

"Chem. Engineering," vol. 62, pp. 228, 230, 232, 234, September 1955.